(12) United States Patent
Anson (10) Patent No.: US 11,671,248 B2
(45) Date of Patent: Jun. 6, 2023

(54) SYSTEM AND METHOD FOR SECURE STORAGE AND DISTRIBUTION OF ENCRYPTION KEYS

(71) Applicant: WILDFI PTY LTD., Banksmeadow (AU)

(72) Inventor: Mark Rodney Anson, Toowong (AU)

(73) Assignee: Wildfi Pty Ltd, Banksmeadow (AU)

(*) Notice: Subject to any disclaimer, the term of this patent is extended or adjusted under 35 U.S.C. 154(b) by 92 days.

(21) Appl. No.: 17/098,645

(22) Filed: Nov. 16, 2020

(65) Prior Publication Data
US 2021/0152338 A1 May 20, 2021

(30) Foreign Application Priority Data
Nov. 16, 2019 (AU) .................................. 2019904318

(51) Int. Cl.
*H04L 9/08* (2006.01)
*H04L 9/14* (2006.01)
*H04L 9/32* (2006.01)

(52) U.S. Cl.
CPC .............. *H04L 9/083* (2013.01); *H04L 9/088* (2013.01); *H04L 9/0894* (2013.01); *H04L 9/14* (2013.01); *H04L 9/3247* (2013.01)

(58) Field of Classification Search
CPC ....... H04L 9/083; H04L 9/088; H04L 9/0894; H04L 9/14; H04L 9/3247; H04L 9/0891; H04L 63/062; H04L 9/16; H04L 9/0819; H04L 9/50
See application file for complete search history.

(56) References Cited

U.S. PATENT DOCUMENTS

| | | | | |
|---|---|---|---|---|
| 2005/0201564 | A1* | 9/2005 | Kayashima | H04W 12/04 380/283 |
| 2008/0089514 | A1* | 4/2008 | Futa | H04L 9/3093 380/44 |
| 2016/0164678 | A1* | 6/2016 | Nix | H04L 9/006 380/270 |
| 2017/0373847 | A1* | 12/2017 | Chien | H04L 9/3221 |
| 2020/0084194 | A1* | 3/2020 | McMurdie | H04L 9/0825 |
| 2020/0178080 | A1* | 6/2020 | Yasaki | H04L 63/0823 |

* cited by examiner

*Primary Examiner* — Henry Tsang
(74) *Attorney, Agent, or Firm* — Rosenberg, Klein & Lee (57) ABSTRACT

A computer system and a method are provided for storage and distribution of encryption keys in sequence. Encryption keys, such as public keys, are provided key pointers as properties, the key pointer indicating another key, to thereby form a sequence. A current key is designated, and the sequence is advanced to a successor key indicated by the key pointer of the current key upon a predetermined succession event. The current key is transmitted upon receipt of a key request. In various embodiments, succession events can include occurrence of an expiration date, or the addition of a new key to the sequence.

11 Claims, 5 Drawing Sheets

SYSTEM AND METHOD FOR SECURE STORAGE AND DISTRIBUTION OF ENCRYPTION KEYS

RELATED PATENTS AND APPLICATIONS

This application is based on Australian Patent Application No. 2019904318, filed on Nov. 16, 2019 and incorporated herein by reference.

BACKGROUND OF THE INVENTION

The subject system and method are generally directed to the field of electronic security.

SUMMARY OF THE INVENTION

The subject system and method generally provide secure storage and distribution of encryption keys, for distribution of a designated "current" key.

In accordance with certain embodiments of the present invention, a method is provided for storage and distribution of encryption keys in sequence. The method includes storing a plurality of encryption keys in a data storage. At least one of the encryption keys has key properties including a key pointer indicating another of the encryption keys. The method further includes defining a sequence of encryption keys by designating one of the encryption keys as a current key, and designating the encryption key indicated by the key pointer of the current key as a successor key. The method further includes, responsive to a predetermined succession event, advancing the sequence of encryption keys by designating the successor key as a new current key, and designating the encryption key indicated by the key pointer of the new current key as a new successor key. The method further includes transmitting the current key to a remote computer system responsive to receipt of a key request indicating the remote computer system.

In accordance with other embodiments of the present invention, instructions are encoded on a non-transitory computer readable medium to perform the above method.

In accordance with still other embodiments of the present invention, a computer system is provided for storage and distribution of encryption keys in sequence. The computer system includes a computer readable memory and a processor, and is coupled to a data storage. Software instructions are stored in the computer readable memory and are executable to perform the above method.

Additional aspects, details, and advantages of the disclosed system and method will be set forth, in part, in the description and figures which follow.

DETAILED DESCRIPTION OF THE PREFERRED EMBODIMENTS

Reference will now be made in detail to exemplary embodiments, which are illustrated in the accompanying drawings, wherein like reference numerals refer to the like elements throughout. The embodiments are described below in order to explain the disclosed system and method with reference to the figures illustratively shown in the drawings for certain exemplary embodiments for sample applications.

Section headings are included in this Detailed Description. It is noted that these section headings are for convenience only and should not be interpreted as limiting the scope of the claimed invention in any way.

Recitations in the Background or associated prosecution history are not an admission against interest that the inventor's contribution resides in the background art.

Any reference to the expression "invention" is defined to mean a reference to aspects of invention only and features recited in Description pertaining to aspects and associated drawings are not mandatory unless expressly stated.

Aspects of invention are not limited to those recited in the Detailed Description, but can include any suitable process/device/article of manufacture capable of performing equivalent function(s).

Figure 1:
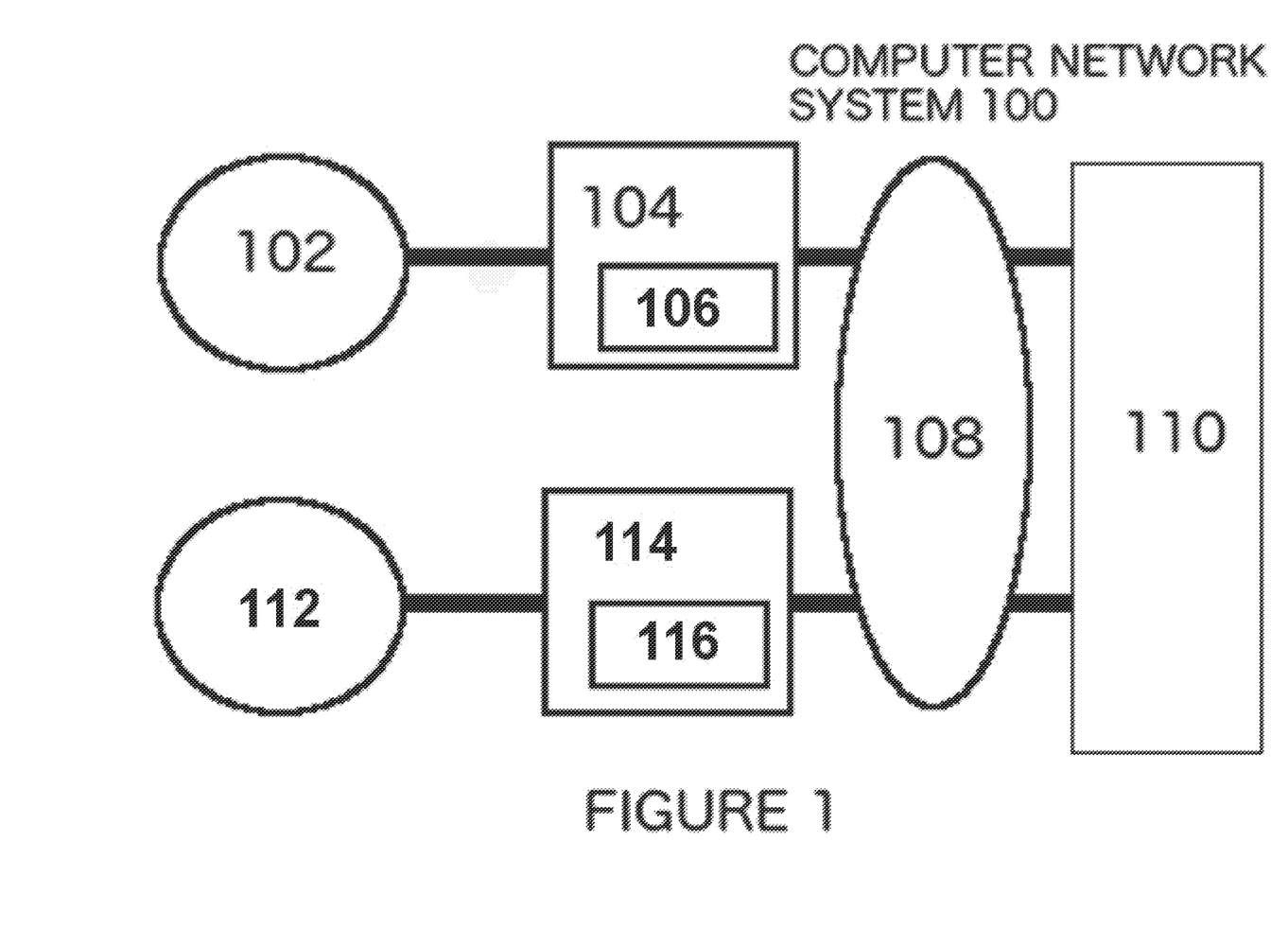
FIG. 1 is a block diagram illustrating a system for creating and sharing of encryption keys, in accordance with an exemplary embodiment of the present invention.

FIG. 1 shows a system 100 for creating and sharing of encryption keys. A new user 102 of the system 100, which includes software encoded on a non-transient computer readable medium, can use a first computer system 104 to create a set of encryption keys 106 containing keys of different types. Computer system 104 can then initiate a process to send a subset of a first set of keys sent to a datacenter 110 via a network 108. A second user 112 of a second computer system 114 can similarly use system 114 to create a second set of new encryption keys 116 and then send a subset of that second set of keys to a datacenter 110 also via network 108. Alternatively, second user 112 can interact with datacenter 110 via a network different to network 108, where the different network can connect to datacenter 110. The datacenter 110 can then facilitate sharing of the keys of user 102 with user 112.

The datacenter 110 can also be connected to other datacenters. The computer network system 100 can contain at least two datacenters and can provide a blockchain being a distributed database for storing and distributing encryption keys, in non-transitory or other data storage media.

The script below defines a single key which, in this example, is an asymmetric public/private key pair created using Elliptic Curve technology and curve secp384r1. This key can be stored as text in a JSON format file that is saved in a file system of a computer system. Other formats including XML can also be used for storage of the key.

```
{
  "Key":"EC secp256k1",
  "Keyid":"617d6e40f792e428bde6cc625c922cc0",
  "Expires":"2018-01-23 01:35:050",
  "NextKey":"60fe3e77dd92dec8851193720dc242f",
  "Public":"MFYwEAYHKoZIzj0CAQYFK4EEAAoDQgAEJ_SKygwhrL-
6JazOR87O8BsORsCKnX4jac1oOplKCIzHThjyy6DFJUyH9yp4W0xYyFpJ2GZ60d2c
ML9BExaHIw..",
  "Private":"MIGbMBAGByqGSM49AgEGBSuBBAAjA4GGAAQB19rrnUUqaBj
bks78q8mEtPdwv128Xfn9u_AQCWI3hYONNeABNBKwli-LZng4tp6YF5NT2uuW_V-
WN-W1-tKPG3kB-rDy6DD_Misefm7JctC8eM5Mu6_HJZwMYJjxWa7L-
MOEi6uN9ILv5XdJtYfeaFhldRMQhUNYZeQj2s_pNX8VycM."
}
```

A set of encryption keys can contain one or more individual keys 106. This file containing the set of keys should be stored in a safe and secure location by the user.

A second set of keys known as the public keys set, which is derived from the first set of encryption keys and which does not contain any private or secret keys, is created by the computer system 104 and sent via the network 108 to the datacenter 110 for inclusion in a blockchain.

The script below defines one key in the public keys set that will be sent via a network to the blockchain.

```
{
  "Key":"EC secp256k1",
  "Keyid":"617d6e40f792e428bde6cc625c922cc0",
  "Expires":"2018-01-23 01:35:050",
  "NextKey":"60fe3e77dd92dec8851193720dc242f",
  "Public":"MFYwEAYHKoZIzj0CAQYFK4EEAAoDQgAEJ_SKygwhrL-
6JazOR87O8BsORsCKnX4jac1oOplKCIzHThjyy6DFJUyH9yp4W0xYyFpJ2GZ60d2c
ML9BExaHIw.."
}
```

Encryption Key Properties

In an aspect of invention, every key a user creates is assigned a set of properties.

One primary property every encryption key possesses is an identifier value or Keyid that can be used to define the key. In one aspect, the identifier value can be a hash value of a key as derived from that key by a cryptographic hash process.

Another primary property of every encryption key is its value that indicates whether the key is a symmetric or asymmetric key, Elliptic Curve and so forth. Examples of key types include but are not limited to the following: AES-256, RSA-2048, secp256k1, secp256r1, secp384r1 secp521r1.

Other properties of a key include an expiry date property, defining a date and time when this key will cease to be used, and a next key property that identifies a next key a user will use as a replacement after the current key has reached the current key's expiry date.

When a new set of encryption keys is created in accordance with an aspect, some keys can be assigned an expiry date property and the next key property of that key can be the keyid identifier value of another key—a second key.

A key identified as Key 1, say, can have a next key value that is the keyid value of a second key, say, Key 2. Alternatively, a key, say Key 3 can have an empty value listed for Key 3's next key property. To use terminology database administrators, understand, the next key value is a foreign key and the keyid is a unique key or primary key.

Two types of assignment are possible in this type of aspect, as is illustrated by script below:
Key1
keyid: 617d6e40f792e428bde6cc625c922cc0
next key: 60fe3e77dd92dec8851193720dc242f
expires: 2018-01-23 01:35:050
Key2
keyid: 60fe3e77dd92dec8851193720dc242f
next key: 8ef221098c9bd0f526a3c73001109801
expires: 2019-11-21 01:35:050

Key3
keyid: 8ef221098c9bd0f526a3c73001109801
next key:
expires:
Key 3 above does not have a designated next key or expiry. The keyid value of Key 3, is listed as the foreign key, the next key, of Key 2.

If a key has a designated expiry date, then that key can have two possible states. If the expiry date is a date in the future then the key will have the additional property that the key is in the active state, whereas when the key has an expiry date in the past then the key will possess the property that the key is in the expired state.

Active Keys

In an aspect of invention, a user can only interact with other users using active keys. A single user can have several active keys that are active at the same time, so that the user is able to interact with a plurality of other users or networks using different keys.

When creating an initial set of keys, or creating any other key created at a later time, the private key of the new next key that was created should be removed from the network and stored in an external location, for example on a USB device stored in a hidden location, or in an encrypted block of data stored within the blockchain. Then, if the current active key is stolen or lost, that next key can be brought out from the key's hidden location and used to create a signed message or "expiry signal" that can be sent to the network and blockchain with the current date as the expire date, alerting the network that the lost key is now listed as expired and invalid. The same or similar processes can be activated for other reasons, including simply that a user or administrator has chosen to deactivate the current key.

In certain embodiments, a key can also be made to automatically expire and be replaced upon other predetermined conditions or events. Upon detection of these conditions, the network will be alerted, by a signal or other means, that the key is now invalid.

Replacement of a Key

With regard to asymmetric keys and public/private key cryptography, if an event arises where a user's current active key, Key 1 say, is about to expire and a next key, Key 2, is about to be activated but the next key field itself does not have a designated next key, then the user will not be able to use a next key in communications with other users. This is because of the rule that only active keys can be used for communications with other users of the network. To activate a key, a user will need to create another new key, Key 3, that will become the next key of the upcoming next key, Key 2 and then send a message containing complete details of the new key, Key 3, to the blockchain via the network. The message can detail all the valid properties of the upcoming next key, Key 3. The message should be digitally signed by the user using the upcoming next key, Key 2, that could have been previously listed as the next key in the properties that define Key 1. Neither the current key nor any other new key can be used to create the signature. In the event that the expiry date has already passed then the same solution can be applied. The user can send a message to the network for inclusion in the blockchain and then that message can contain valid details for the upcoming key and a new next key that will be used subsequently.

The script below illustrates an event message that can be included in the blockchain data in an event where a new key is introduced as a replacement for an earlier key.

In an aspect of invention, no key other than a valid next key can replace an active key. Consequently, it is recommended that the next key of a user should always be stored in an inaccessible location and never stored on a user's computer system connected to a network—at least not in unencrypted form.

Symmetric and Asymmetric Keys

With regard to symmetric keys, these keys can be identified by a keyid value derived from a cryptographic hash process. That keyid value of a specific key can be listed in a blockchain. With regard to asymmetric keys, the public key of a key pair can be passed through a cryptographic hash process to produce a keyid value, and that keyid value can signify a public key and the public key's associated private key.

Symmetric keys are not used for creating digital signatures. Symmetric keys have different functionality from asymmetric keys. Asymmetric keys can be used to create a digital signature and the digital signature can be used to authenticate the origin of a message through a process that takes the signature text and the associated public key as input and then outputs a Boolean "verified" or "not verified" result. Another difference between symmetric and asymmetric keys is that symmetric keys, according to one aspect, do not have any expiry date.

Any key, symmetric or asymmetric can be withdrawn from usage after a period of time. Particularly if it is suspected that the key to be withdrawn has been compromised.

The identification value, id value, of keys can be added to the blockchain, and signed by an active asymmetric key. The

```
{"Event":"Expire Lost Key",
"Info":[
{
"Key":"EC secp256k1",
"Keyid":"617d6e40f792e428bde6cc625c922cc0",
"Public":"MFYwEAYHKoZIzj0CAQYFK4EEAAoDQgAEJ_SKygwhrL-
6JazOR87O8BsORsCKnX4jac1oOplKCIzHThjyy6DFJUyH9yp4W0xYyFpJ2GZ60d2c
ML9BExaHIw..",
"Expires":"2018-01-23 01:35:050",
"NextKey":"792e428bde6cc617d6e4022cc0f625c9",
"Signature":"KCIzHThjyy6DFJUyH9yp4W0xYyFpJ2GZ60d2YFK4EEAAoDQg
AEJ_SKygwhrL"
},
{
"Key":"EC secp256k1",
"Keyid":"792e428bde6cc617d6e4022cc0f625c9",
"Public":"MFYwEAYHK-
oZIzj0CAQYFK4EEAAoDQgAEJ_SKygwhrL6JazOR87O8BsORsCKnX4jac1oOplKCI
zHThjyy6DFJUyH9yp4W0xYyFpJ2GcML9BExaHIwZ60d2..",
"Expires":"2019-21-13 01:35:050",
"NextKey":"60f2dec885119e3e77dd9372f20dc24"
},
{
"Key":"EC secp256k1",
"Keyid":"60f2dec885119e3e77dd9372f20dc24",
"Public":"MFYwEAYwhrLHKoZIzj0CAQYFK4EEAAoDQgAEJ_SKyg6JazOR
87O8BsORsCKnX4jac1oOplKCIzHThjyy6DFJUyH9yp4W0xYyFpJ2GZ60d2cML9BEx
aHIw..",
"Expires":"",
"NextKey":""
}
]
}
```

In the script above the Expires date for the first key can be a date in the past. In adding this block to the blockchain, the user broadcasts a message to a network of users that a particular key is now invalid.

symmetric key itself is not added to the blockchain in an unencrypted format, but it can be shared in secret communications between users in a process facilitated by the use of a blockchain data storage module.

Storing Keys in a Blockchain

A symmetric key can be stored in the blockchain by a method we shall now describe. A user (first user) can use an Elliptic Curve keypair including a public and a private key to encrypt a symmetric key, then the output of that encryption process can be stored as a text object within text in the blockchain. The user can thereby use the blockchain as a storage container where they can keep many keys, perhaps hundreds of keys, that can be downloaded from the blockchain at any time and decrypted by means of a single key pair of public and private keys. In this way, the blockchain facilitates the storage of keys by a user, so that the user therefore need only keep a single keypair composed of a public key and a private key in an immediately accessible location, while also being able to access potentially hundreds of other keys stored in a blockchain. The encrypted keys stored in the blockchain in this manner can consequently have sets of associated properties stored along with them in the blockchain, in order that those encrypted keys can be found and utilized. Therefore, in the context of the process described here, one aspect describes a system for storing keys together with sets of associated properties in a blockchain for the purpose of providing an encryption key storage and key management system.

In one aspect of invention, two individual users can exchange public keys. Then the first user can create a new symmetric key such as "YX7KBSwdE . . . " and then encrypt the symmetric key with the first user's private key and the second user's public key, using an Elliptic Curve Integrated Encryption Scheme (ECIES). The output of the encryption process can be converted to a block of text and stored in the blockchain. The second user can then retrieve the block of text from the blockchain, decrypt the text using the second user's private key and the first user's public key and then discover the original symmetric key "YX7KBSwdE . . . " within the data. One aspect provides a system of storing symmetric keys together with sets of associated properties in a blockchain in order to securely transfer keys created by one user to a second user.

By a similar process, an asymmetric public key can be transferred by one user to another user by means of a blockchain. An asymmetric public key can be stored together with sets of associated properties in a blockchain for the purpose of providing a secure method of transferring the public key created by one user to a recipient second user.

In a further process, a blockchain can facilitate the process of sending an asymmetric private key created by a first user to a second user via the blockchain. The method described here provides a method in which one user such as a network administrator of the network can create all asymmetric encryption keypairs for members of the network. Then, according to one aspect, the administrator can physically or electronically hand over the private and public keys to employees working within that network. This mechanism enables the network administrator to decrypt all communications of users of the network, if circumstances require that intervention. Therefore, in the context of the process described here, a system of storing an asymmetric private key together with sets of associated properties in a blockchain for the purpose of providing a secure method of transferring a private key created by one user to a second user is provided. In this way, the blockchain becomes a means of distribution of asymmetric encryption keys created by one user who wishes to distribute those keys to many other users.

Creating a Block in the Blockchain

In the context of one aspect of invention, a blockchain is a distributed database that maintains a continuously growing list of ordered records called blocks, in which each block can contain a timestamp property as one item of information within a set of properties, where the properties signify one block's relationship to the previous blocks in the blockchain. The set of properties in a blockchain can contain, but are not limited to, the following properties: a timestamp, an id value and a parent block id value. The blocks can be connected together in an unbranched fashion according to one aspect and in another aspect the blocks can form branches. Similarly, while the latter properties define one set of blocks according to one aspect, in another aspect a different set of property values can be used to identify each block.

Aspects of invention provide a method of growth of the blockchain. Aspects of invention facilitate a constantly growing distributed database that has self-healing properties. According to one aspect, this blockchain is able to repair itself even in the event of massive network outages that could temporarily interrupt communications between datacenters on different continents which are hosting the blockchain and adding new blocks.

In an aspect of invention, new blocks of the blockchain are added in a process that involves collaboration between a collection of datacenters.

Figure 2:
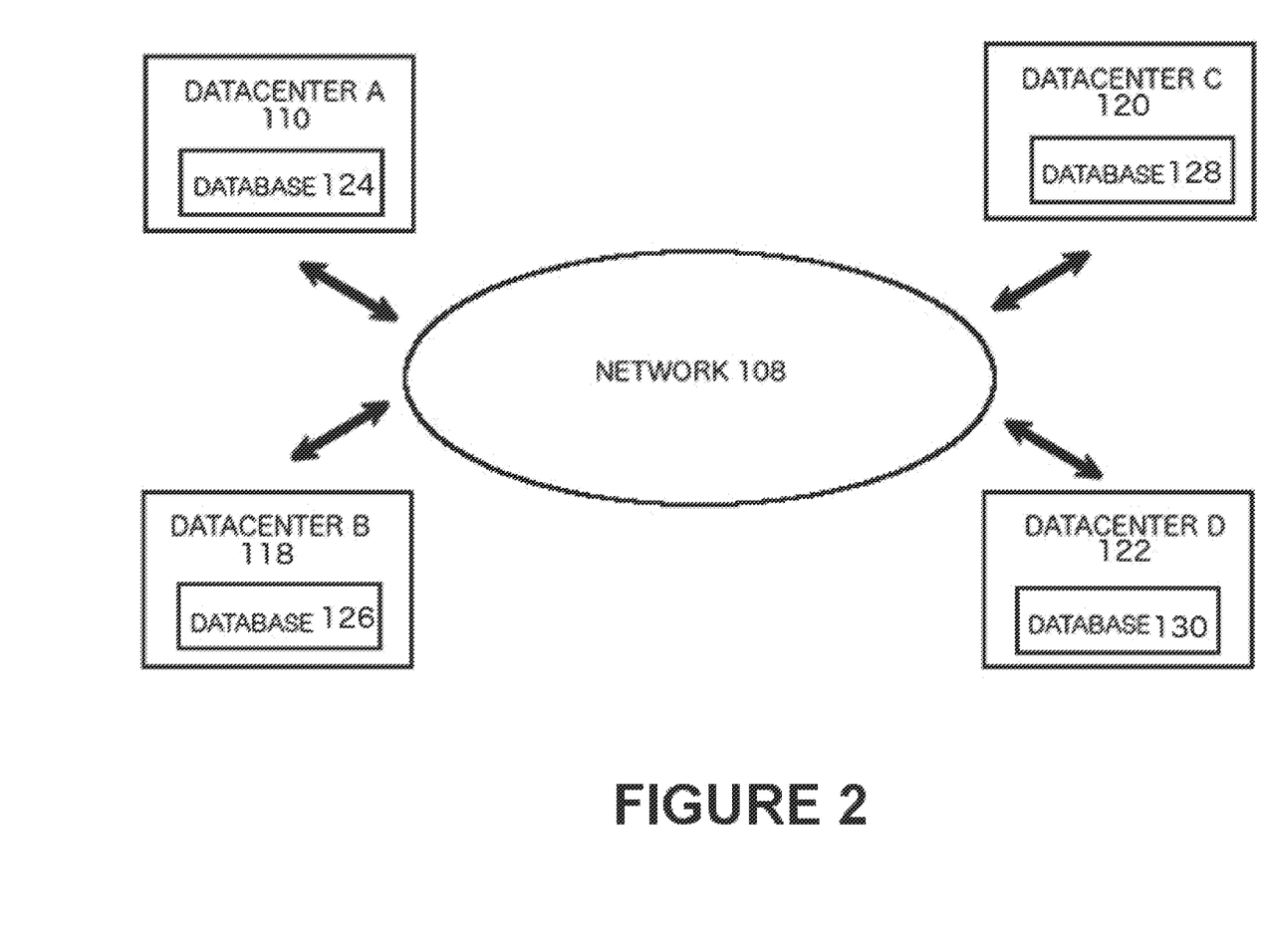
FIG. 2 is a block diagram illustrating a plurality of systems participating in creation of a blockchain, in accordance with an exemplary embodiment of the present invention.

FIG. 2 illustrates a network 108 also seen in FIG. 1 that connects to four datacenters named Datacenter A 110, Datacenter B 118, Datacenter C 120 and Datacenter D 122 together. Each of the latter datacenters contain databases 124, 126, 128 and 130 respectively. In one aspect of invention, these four datacenters can be physically located on different continents of the globe such as North America and Australia. The script below defines a single block within the blockchain.

```
{
"Timestamp":"2018-01-23 01:35:050",
"Parent":"c730011098018ef221098c9bd0f526a3",
"Data":[
    {
    "From": "Datacenter A",
    "Hash": "0f526a3c7300221098c9b110988efd01",
    "Signature":
"OR87O8BsORsCKnX4jac1oOplKCIzHThjyy6DFJUyH9yp4W0xYyF",
    "Confirmation": "Datacenter B",
    "SignatureConfirmation":
"nX4jac1oOplKCIzHThOR87O8BsORsCKjyy6DF0xYyFJUyH9yp4W",
    "DateTime": "2018-01-23 01:35:050"
    },
    {
    "From": "Datacenter B",
    "Hash": "300221098c9b110f526a3c70988efd01",
    "Signature":
"sORsCKnX4jaOR87O8Bc1oOplKCIzHThj0xYyFyy6DFJUyH9yp4W",
    "Confirmation": "Datacenter A",
    "SignatureConfirmation":
"1oOplKCIzHThjyy6DFJOR87O8BsORsCKnX4jacUyH9ypyF4W0xY",
    "DateTime": "2018-01-23 01:37:050"
    },
    {
    "From": "Datacenter C",
    "Hash": "21098c9b1109880f526a3c7d013002ef",
    "Signature":
"4W0xYyFOR87O8BsORsCKnX4jac1oOplKCIzHThjyy6DFJUyH9yp",
    "Confirmation": "Datacenter D",
    "SignatureConfirmation":
"8BsORsCKnX4OR87Ojac1oODFJUyH9yp4W0xYyFplKCIzHThjyy6",
    "DateTime": "2018-01-23 01:35:000"
    },
    {
    "From": "Datacenter D",
```

-continued

```
"Hash": "300221098c9b110f526a3c70988efd01",
"Signature":
"sORsCKnX4jaOR87O8Bc1oOp|KCIzHThj0xYyFyy6DFJUyH9yp4W",
    "Confirmation": "Datacenter C",
    "SignatureConfirmation":
"BsORsCKnX4jac1oOR87O8p|KCIzHThjyy6xYyFDFJUyH9yp4W0",
    "DateTime": "2018-01-23 01:37:150"
  }
 ]
}
```

In an aspect of invention, there will be a fixed number of datacenters in the network, and also a finite number of blocks and associated data. Block data can be organized in a consistent manner across databases to facilitate ease of data transfer. The "Hash" property listed within the block of data illustrated above is a property derived from a block of text containing one or more encryption keys and associated property values when that text block is processed by means of a cryptographic hash process. The "Hash" property can be used to define a block of text containing keys stored in the network in at least two redundant locations. The blockchain therefore includes individual block records as shown above and associated blocks of text containing keys and property meta-data. The general principles defined here can be applied to other aspects of invention and applications without departing from the spirit and scope of aspects invention described and illustrated. Blocks in the blockchain can include "Hash" value references that refer to designated large blocks of data that contain numerous items such as keys, property records, links and appendices. The general principle is that a fixed "Hash" value refers to a specific un-alterable block of information of a specific form and format, which can itself be a reference as recited above, to yet further blocks of text, binary data or other containers of information. In an aspect, a block in a blockchain can act as a pointer to data stored on other servers. Recited aspects of invention are not intended to be limited to aspects shown, but are to be accorded the widest scope consistent with the principles and features disclosed herein, and the general principle is that an un-alterable block of text within the blockchain can refer to other unalterable blocks that are stored in a plurality of locations in the blockchain network.

In one aspect Datacenter A, can be located in Oregon in the USA and Datacenter B can be located in California USA. Datacenter C can be located in Queensland Australia and Datacenter D in Victoria Australia. The datacenters that are on the same continent could, over one period of time, have excellent connectivity and typically could very rarely experience network outages but there could be occasional outages that cause datacenters in the USA to lose connectivity to the Australian datacenters. One aspect is designed to allow for datacenters connected to the blockchain to continuously add new blocks of validated data to the blockchain even if there is no network connectivity for an extended period of time between datacenters on different continents. The way this result is achieved is that new blocks are added to the blockchain if two datacenters, for example two datacenters in Australia, are able to keep adding and validating one another's new blocks of data, even during an outage when the network connecting Australia and the USA say is not functioning. If two datacenters in the USA are also able to connect to one another via a network, then those United States datacenters can also continue adding and validating each other's new blocks of data. Then when network connectivity is restored between Australia and the USA a sequence of events can typically be initiated which can restore and merge the Australian and American blocks of the blockchain. In another aspect, only one datacenter could exist in AU and a second datacenter associated with a second and later merged branch could exist in the US.

Figure 3:
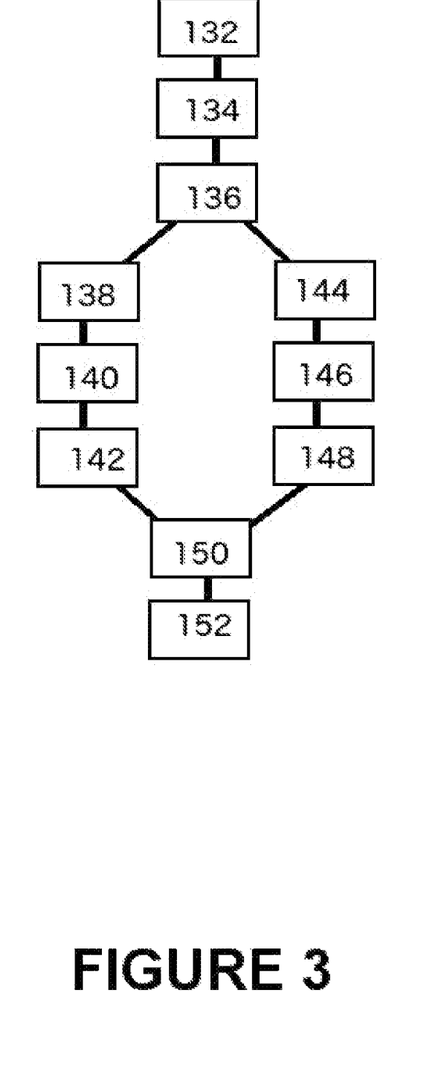
FIG. 3 is a depiction of an illustrative example of parallel streams of data, encoded on a computer readable medium, to secure the system and associated keys against network disruption, in accordance with an exemplary embodiment of the present invention.

FIG. 3 illustrates a self-healing blockchain. The series of blocks 132, 134, 136 represent a series of blocks created before a network outage that interrupts communications between the datacenters in Australia and the datacenters in America. The series of blocks 138, 140 and 142 have the block 136 as their parent block and this series of blocks represents blocks in a blockchain created say at datacenters in Australia during the time that the network outage persists. The series of blocks 144, 146, 148 represents a series of blocks created by datacenters in America, which also share the same parent block 136 with datacenters in Australia. When network connectivity is restored, the two branches of the chain being 138-142 and 144-148 can be merged, as is the case with block 150 in FIG. 3 above joining the two branches.

With reference to FIG. 2 again, the process of creating a single block will now be explained, in order to explain the complexities of how this procedure operates.

FIG. 2 illustrates four different datacenters, with Datacenter A and Datacenter B both situated in America say. As seen in FIG. 1, a new user 102 of a subsidiary network 108 can use a computer system 104, to create a set of encryption keys. A second set of keys known as the "public key" set, which is derived from the first set of encryption keys and does not contain any private or secret keys, is created by the computer system 104 and sent to subsidiary network 108 and then to a datacenter 110 for inclusion in a blockchain.

Figure 4:
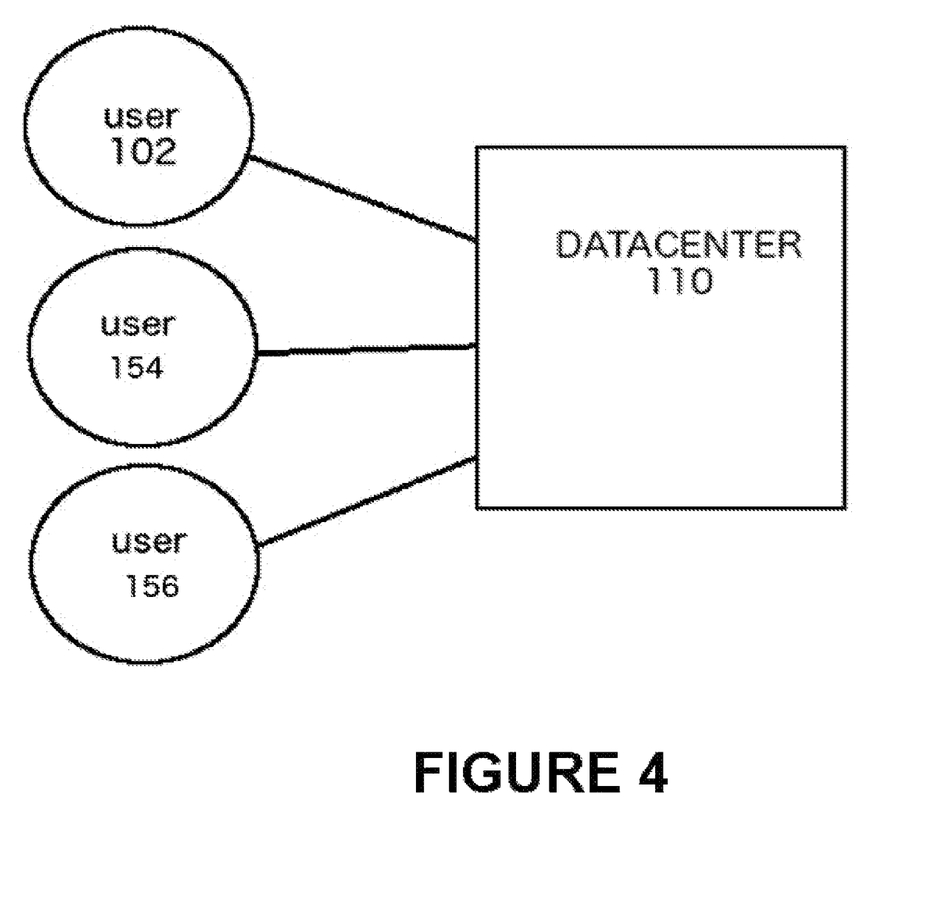
FIG. 4 is a depiction of an illustrative example of plurality of users interacting with a single data center, in accordance with an exemplary embodiment of the present invention.

FIG. 4 shows one aspect of current invention in which a plurality of users can interact with a single data center. In this case, according to one aspect, public keys of a new user 102 are sent to Datacenter A 110. Then the keys of two other new users 154 and 156 are also received by Datacenter A. The keys of these three new users are entered into a structured block of text in formats that can include but are not limited to XML or JSON which are stored in a database module 124 seen in FIG. 2. Taking this text as input, Datacenter A 110, see FIG. 2 above, can initiate a process to get a cryptographic hash value of the text, which returns a value.

Next, Datacenter A 110 can execute a process that uses an Elliptic Curve private key to create an ECDSA digital signature, encoding the hash value of the block as the signature text. According to one aspect signing can occur before hashing and in another aspect after hashing.

Datacenter A 110 can store the three values as a database record in a database storage module 124 shown in FIG. 2. Datacenter A 110 then takes the three items of data and sends the items to Datacenter B 118 for co-signing. Receiving the three items, Datacenter B 118 performs the following two actions: Datacenter B 118 first validates the hash value with the digital signature. By this operation, Datacenter B 118 is able to confirm that the expected hash value consistent with the digital signature value. This means, Datacenter B 118 can trust that the message that Datacenter B 118 has received has been signed with a key belonging to Datacenter A 110. Datacenter B 118 then performs a process to get the cryptographic hash value of the text. If the hash values are consistent then Datacenter B 118 can create an ECDSA digital signature using an Elliptic Curve private key belonging to Datacenter B 118. Datacenter B 118 can send a response message to Datacenter A 110 that contains a single value, the digital signature of Datacenter B 118. Datacenter A 110 can then verify that the purported digital signature of Datacenter B 118 is in fact correct input. Then Datacenter A 110 can update database Datacenter A's 110 records 124. Finally, Datacenter B 118 can store all relevant data including the digital signature that Datacenter B 118 created in Database B's records 126.

At this juncture, a block of data containing the keys of three users is backed up redundantly. The data is stored in two separate locations by Datacenter A 110 and Datacenter B 118. Further, there are two digital signatures with the hash value as their signature text which is also stored in two independent databases being Databases 124 and 126 of Datacenter A 110 and Datacenter B 118 respectively.

Datacenter A 110 now creates a new timestamp value detailing a moment in time approximately ten seconds in the future. Datacenter A 110 then broadcasts the four data items to all the other datacenters within the network, informing the other datacenters of the proposal to create a new block in the blockchain with an associated timestamp value.

In one aspect, a message broadcast to all other datacenters by Datacenter A 110 can be represented in the form of the following JSON data structure:

```
{
"From": "Datacenter A",
"Hash": "0f526a3c7300221098c9b110988efd01",
"Signature":
"OR87O8BsORsCKnX4jac1oOplKCIzHThjyy6DFJUyH9yp4W0xYyF",
"Confirmation": "Datacenter B",
"SignatureConfirmation":
"nX4jac1oOplKCIzHThOR87O8BsORsCKjyy6DF0xYyFJUyH9yp4W",
"DateTime": "2018-01-23 01:35:050"
}
```

In one aspect, there can be a fixed number of datacenters in the network. In one aspect, a new block can be created every ten seconds. All datacenters within the network can be configured to create new blocks of the blockchain at periodic intervals, for example say every ten seconds. For the first five seconds in each time span, all datacenters proposing to add new blocks within the network can signal one another that they have new blocks to add which can be identified by a specific hash value and further notifying each other of the id number of the current "parent" block in the blockchain.

For the first five seconds of each timespan, datacenters can advise one another about the new block information that each of those datacenters chooses to add. At the end of the five second period, each of the datacenters can examine all the notifications that each datacenter has received from other datacenters and determine which block has the most complete details. Details from the different blocks can be merged, in an attempt to create the most complete block of data. The datacenters can then broadcast the most complete block of data to all other datacenters. When a datacenter receives a complete block of data it can compare that block to other blocks that the datacenter has received or created, and discard whatever block has the least complete information. When the moment arrives when a new block is due to be created, each datacenter can preferably have already determined a best candidate block for inclusion in the blockchain, and can then promote that candidate block to the status of being the current block in the blockchain, and the eventual parent block of subsequent blocks.

FIG. 3 shows a series of blocks such as 138, 140 and 142 created by a datacenter in say Australia that can be merged with the series of blocks 144, 146 and 148 created by a datacenter in America say because every block that is being promoted for inclusion in the blockchain ought to be validated by a second datacenter and stored redundantly in at least two datacenters. The fact that a datacenter in Australia records a blockchain sequence such as 132, 134, 136, 138, 140, 142 and 150 whereas a datacenter in America records the sequence as 132, 134, 136, 144, 146, 148 and 150 is factually not a problem. It is in fact similar to the way different drops of water within a river can flow on the left side or the right side of an island that they are passing by, but the stream as a whole is re-formed on the downside of the island. In a one aspect, all of the blocks of information in the blockchain can be indexed by a search engine and made available to users, and the fact that at least two datacenters are storing the keys of new users guarantees that a new user's public keys can be found by searching data within the entire network.

In one aspect, a block in the blockchain represented in JSON data format can take the form illustrated in the next block of script below.

By mutual agreement among the different datacenters building and maintaining the blockchain, a limited group of datacenters or entities can be included in each block in the blockchain, as is illustrated in the next block of script below.

By mutual agreement, again, the blocks of data can be structured in a specific format. The data can be arranged in a manner in which data is sorted alphabetically, as would be the case if the first record in each block were to be the name of a datacenter.

Each datacenter included in this process can build a structured block of data at intervals of say 10 seconds and each datacenter can use the same Timestamp object for the blocks that are created every 10 seconds.

The consequence of this procedure is that every datacenter can create a block that is identical to the blocks created by other datacenters.

```
{
"Timestamp":"2018-01-23 01:35:050",
"Parent":"c730011098018ef221098c9bd0f526a3",
"Data":[
{
"From": "Datacenter A",
"Hash": "0f526a3c7300221098c9b110988efd01",
"Signature":
"OR87O8BsORsCKnX4jac1oOplKCIzHThjyy6DFJUyH9yp4W0xYyF",
"Confirmation": "Datacenter B",
"SignatureConfirmation":
"nX4jac1oOplKCIzHThOR87O8BsORsCKjyy6DF0xYyFJUyH9yp4W",
"DateTime": "2018-01-23 01:35:050"
},
{
"From": "Datacenter B",
"Hash": "300221098c9b110f526a3c70988efd01",
"Signature":
"sORsCKnX4jaOR87O8Bc1oOplKCIzHThj0xYyFyy6DFJUyH9yp4W",
"Confirmation": "Datacenter A",
"SignatureConfirmation":
"1oOplKCIzHThjyy6DFJOR87O8BsORsCKnX4jacUyH9ypyF4W0xY",
"DateTime": "2018-01-23 01:37:050"
},
{
"From": "Datacenter C",
"Hash": "21098c9b1109880f526a3c7d013002ef",
"Signature":
"4W0xYyFOR87O8BsORsCKnX4jac1oOplKCIzHThjyy6DFJUyH9yp",
"Confirmation": "Datacenter D",
"SignatureConfirmation":
"8BsORsCKnX4OR87Ojac1oODFJUyH9yp4W0xYyFplKCIzHThjyy6",
"DateTime": "2018-01-23 01:35:000"
},
{
"From": "Datacenter D",
```

```
    "Hash": "300221098c9b110f526a3c70988efd01",
    "Signature":
"sORsCKnX4jaOR87O8Bc1oOplKCIzHThj0xYyFyy6DFJUyH9yp4W",
    "Confirmation": "Datacenter C",
    "SignatureConfirmation":
"BsORsCKnX4jac1oOR87O8plKCIzHThjyy6xYyFDFJUyH9yp4W0",
    "DateTime": "2018-01-23 01:37:150"
    }
  ]
}
```

This block in a blockchain contains valid records for four datacenters that have uninterrupted communications.

The script above illustrates a block where four datacenters are in communication with each other and each of these four datacenters have provided a new "Hash" value signifying a block of text that a first Datacenter has sent to a second Datacenter for co-signing. The script above illustrates that Datacenter A has created a new hash value with an associated SignatureConfirmation that has been provided by Datacenter B. This also indicates that the data Datacenter A plans to add to the blockchain is redundantly backed up on Datacenter B.

```
{
  "Timestamp":"2018-01-23 01:35:050",
  "Parent":"c730011098018ef221098c9bd0f526a3",
  "Data":[
    {
    "From": "Datacenter A",
    "Hash": "0f526a3c7300221098c9b110988efd01",
    "Signature":
"OR87O8BsORsCKnX4jac1oOplKCIzHThjyy6DFJUyH9yp4W0xYyF",
    "Confirmation": "Datacenter B",
    "SignatureConfirmation":
"nX4jac1oOplKCIzHThOR87O8BsORsCKjyy6DF0xYyFJUyH9yp4W",
    "DateTime": "2018-01-23 01:35:050"
    },
    {
    "From": "Datacenter B",
    "Hash": "300221098c9b110f526a3c70988efd01",
    "Signature":
"sORsCKnX4jaOR87O8Bc1oOplKCIzHThj0xYyFyy6DFJUyH9yp4W",
    "Confirmation": "Datacenter A",
    "SignatureConfirmation":
"1oOplKCIzHThjyy6DFJOR87O8BsORsCKnX4jacUyH9ypyF4W0xY",
    "DateTime": "2018-01-23 01:37:050"
    },
    {
    "From": "Datacenter C",
    "Hash": " ",
    "Signature": " ",
    "Confirmation": "",
    "SignatureConfirmation": " ",
    "DateTime": ""
    },
    {
    "From": "Datacenter D",
    "Hash": "",
    "Signature": "",
    "Confirmation": "D",
    "SignatureConfirmation": "",
    "DateTime": ""
    }
  ]
}
```

The script above illustrates a blockchain block where only two datacenters are in communication with each other. However, in principle three or more datacenters can be used to cross check data against each other.

The Hash reference identifies a text object with this cryptographic hash signifier, a signifier first computed by Datacenter A and later confirmed to be valid by Datacenter B. This text object is a structured block of text that can be organized in a number of forms, such as in the form of structured data in formats such as XML or JSON to name just two formats.

The object can contain a variety of different objects. Examples of those objects, without limitation, are text objects containing public keys of a new user, text containing additional keys created by a user and notifications that a key has been assigned a specific Expiry property.

These and related processes, and other necessary instructions, are preferably encoded as executable instructions on one or more non-transitory computer readable media, such as hard disc drives or optical discs, and executed using one or more computer processors, in concert with an operating system or other suitable measures.

In a software implementation, the software includes a plurality of computer executable instructions, to be implemented on a computer system. Prior to loading in a computer system, the software preferably resides as encoded information on a suitable non-transitory computer-readable tangible medium, such as a magnetic floppy disk, a magnetic tape, CD-ROM, DVD-ROM, solid-state disk, flash memory device, or pre-existing data storage (such as "cloud storage") accessible through an operably coupled network means (such as the Internet).

In certain implementations, the invention includes a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) are in certain embodiments also developed to perform these functions.

Figure 5:
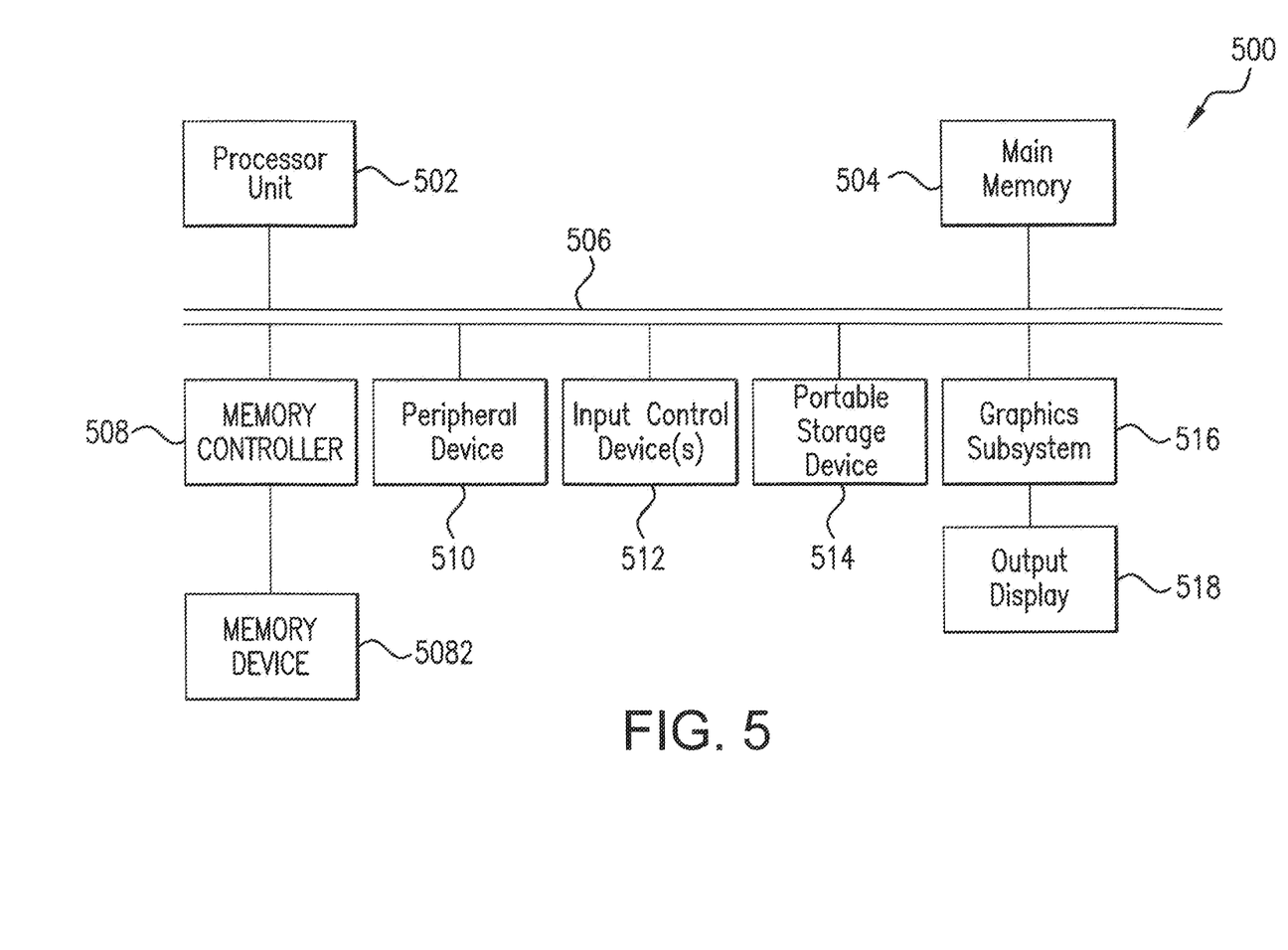
FIG. 5 is a block diagram illustrating an exemplary computer system for programmatic and/or hardware implementation of various embodiments and aspects of the present invention.

As an example, FIG. 5 is a block diagram illustrating an exemplary computer system for programmatic and/or hardware implementation of various aspects of the disclosed system and method. For instance, in various embodiments the system serves as a host for such hardware modules, and/or as a host for executing software modules such as electronic design automation (EDA) tools/simulations/emulation/firmware, in accordance with various configurations of the disclosed system and method.

According to certain embodiments, computer system 500 includes a processor unit 502, a main memory 504, an interconnect bus 506, a memory controller 508 that is coupled to a memory device 5082, peripheral device(s) 510, input control device(s) 512, portable storage medium drive(s) 514, a graphics subsystem 516, and an output display 518. Depending on the particular embodiment and the requirements of the intended application, all or only certain portions of the system components functionally shown may need actual implementation.

In various embodiments, processor unit 502 includes a single microprocessor or a plurality of microprocessors for configuring computer system 500 as a multi-processor system. Main memory 504 stores, in part, instructions and data to be executed by processor unit 502. Main memory 504 preferably includes banks of dynamic random access memory (DRAM) as well as high-speed cache memory.

For the purpose of simplicity, the components of computer system 500 are depicted to be interconnected via interconnect bus 506. However, in alternate embodiments, computer system 500 is interconnected through one or more data transport means. For example, in certain embodiments, processor unit 502 and main memory 504 are interconnected via a local microprocessor bus; and memory controller 508, peripheral device(s) 510, portable storage medium drive(s) 514, and graphics subsystem 516 are interconnected via one or more input/output (I/O) buses. Memory device 5082 is preferably implemented as a nonvolatile semiconductor memory for storing data and instructions to be used by processor unit 502. Memory device 5082 preferably stores the software to load it to the main memory 504, but in alternate embodiments is represented in an EDA tool simulation by suitable classes (incorporating data structures and functions operable upon the data structures) or the like as would be known to one of skill in the art.

Portable storage medium drive 514 operates to input and output data and code to and from the computer system 500. In one configuration, the software is stored on such a portable medium, and is input to computer system 500 via portable storage medium drive 514. In various embodiments, peripheral device(s) 510 includes any type of computer support device such as an input/output (I/O) interface, to add additional functionality to computer system 500. For example, in certain embodiments, peripheral device(s) 510 includes a network interface card, to interface computer system 500 to a network. In certain embodiments, peripheral device(s) also includes a memory controller and nonvolatile memory.

Input control device(s) 512 provide a portion of the user interface for a computer system 500 user. In various embodiments, input control device(s) 512 includes an alphanumeric keypad for inputting alphanumeric and other key information; and a cursor control device such as a mouse, a trackpad or stylus; or cursor direction keys.

In order to display textual and graphical information, computer system 500 includes graphics subsystem 514 and output display(s) 518. In various embodiments, output display 518 includes a cathode ray tube (CRT) display, liquid crystal display (LCD), plasma, or active matrix organic light emitting diode (AMOLED) display. Graphics subsystem 516 receives textual and graphical information, and processes the information for output to display 518.

INDUSTRIAL APPLICABILITY

In use, security of blockchain operations can be improved by:

Simultaneously creating identical blocks in a blockchain by at least two independent computer systems.

Storing encryption keys in a blockchain to ensure that communications within and more generally associated with the blockchain are secure.

Storing keys together with sets of associated properties of the keys in the blockchain for the purpose of providing an encryption key storage and management system.

Providing a self-healing capacity for the blockchain that enables the blockchain to form at least two branches, where the branches can be re-formed into a single blockchain sequence.

Providing notification to a network of users of the change of state of an encryption key belonging to a specific user, in which the change of state can involve states including but not limited to the fact that: (i) a key has become available to use for an encryption process; (ii) that the key should now be treated as invalid or (iii) that a key is to be replaced by a second key.

Providing notification to a network of users that a designated user has a plurality of currently valid encryption keys, thus, if a first user does not trust a specific algorithm then the first user can use a different encryption system such as the Elliptic Curve secp384r1 for communications.

Providing a secure method of transferring keys created by one user to a recipient second user to ensure security of communications within and external to the blockchain. Key storage thus directly improves security of the blockchain and also incidentally improves security of external communications.

Storing an asymmetric public key together with sets of associated properties in a blockchain for the purpose of providing a secure method of transferring the public key created by one user to a recipient second user, thus ensuring secure communications in association with the blockchain.

Storing an asymmetric private key together with sets of associated properties in a blockchain for the purpose of providing a secure method of transferring a private key created by one user to a recipient second user.

The two latter provisions enhance blockchain security by providing a secure means for distribution of public, private and symmetric keys between users.

A system and process that facilitates the use and replacement of encryption keys wherein a key must be designated to have one and only one specific replacement key before a first key can be accepted as a valid key within a network of users; where only a specific designated second encryption key can succeed the first key.

Use of a blockchain for key storage and distribution, whether the keys be private, public or purely symmetric improves security of communications of data directly and indirectly associated with the blockchain.

Reservations, Qualifications and Further Definitions

Copyright in drawings the subject of this application is reserved and remains the property of Wildfi Pty Ltd ACN 165 280 508 and its assigns.

The description in the body of the specification pertains to various aspects of invention. Accordingly, features recited in the body of the specification should not be construed to be essential features of the invention unless indicated by the claims. Further, any reference in the body of the specification to the expression "invention" should be construed to imply a reference to aspects of invention only, that is a reference to variations upon the inventor's contribution. The expression "preferred" in the context of aspects/modes refers to advantageous albeit non-mandatory variations/aspects of invention. Variations, including variations in components, arrangement, addition/deletion/substitution of components and variations in materials or dimensions can also be contemplated by person skilled in the art and claimed. Accordingly, no admission is made that aspects of invention, as claimed, pertain only to most advantageous aspects of invention.

No discussion of prior art in this application including the Background or in a parent application or in associated prosecution should be construed as an admission that the inventor's contribution resides in the prior art.

Discussion, if any, of defects in the prior art should not be construed as an admission that limitations pertaining to a claim are impliedly excluded/included.

No admission is made that limitations, if any, referred to in the Title, Background, Summary or elsewhere in the body of the specification or the associated prosecution are to be impliedly read into the claims. Accordingly, variations upon aspects recited above and apparent to those skilled in the art are limited only by the claims and not by way of drawings or textual description in the specification that reside outside the claims.

The descriptions above are intended to illustrate possible implementations of the disclosed system and method, and are not restrictive. While this disclosure has been made in connection with specific forms and embodiments thereof, it will be appreciated that various modifications other than those discussed above may be resorted to without departing from the spirit or scope of the disclosed system and method. Such variations, modifications, and alternatives will become apparent to the skilled artisan upon a review of the disclosure. For example, functionally equivalent elements or method operations are substitutable for those specifically shown and described, and certain features are usable independently of other features. Additionally, in various embodiments, all or some of the above embodiments are selectively combined with each other, and particular locations of elements or sequence of method operations are reversed or interposed, all without departing from the spirit or scope of the disclosed system and method as defined in the appended claims. The scope should therefore be determined with reference to the description above and the appended claims, along with their full range of equivalents.

What is claimed is:

1. A method for storage and distribution of encryption keys in sequence, the method comprising:
   storing a plurality of encryption keys in a data storage, at least one of the encryption keys having key properties including a key pointer, the key pointer indicating another of the encryption keys, each of the plurality of encryption keys stored in the data storage is a public key having a corresponding private key;
   defining a sequence of encryption keys by:
      designating one of the encryption keys as a current key, and
      designating the encryption key indicated by the key pointer of the current key as a successor key;
   responsive to a predetermined succession event, advancing the sequence of encryption keys by:
      designating the successor key as a new current key, and
      designating the encryption key indicated by the key pointer of the new current key as a new successor key;
      wherein the predetermined succession event is receipt by the data storage of an additional key which has been digitally signed using the private key corresponding to a next key;
   transmitting the current key to a remote computer system responsive to receipt of a key request indicating the remote computer system; and
   adding an additional key to the sequence of encryption keys by:
      receiving the additional key which has been digitally signed using the private key corresponding to an encryption key presently stored in the data storage, and
      setting the key pointer of the presently-stored key to indicate the additional key.

2. The method of claim 1, wherein the key properties further include expiry data indicating an expiry date, and wherein the predetermined succession event is occurrence of the expiry date indicated by the expiry data of the current key.

3. The method of claim 1, wherein the predetermined succession event is receipt by the data storage of an expiry signal which has been digitally signed using the private key corresponding to the successor key.

4. The method of claim 1, wherein the data storage is a blockchain database.

5. The method of claim 1, wherein the key properties further include a key identifier, each key pointer being the key identifier of another encryption key to thereby indicate the another encryption key.

6. A non-transitory computer readable medium encoded with instructions to perform a method comprising:
   storing a plurality of encryption keys in a data storage, at least one of the encryption keys having key properties including a key pointer, the key pointer indicating another of the encryption keys, each of the plurality of encryption keys stored in the data storage is a public key having a corresponding private key;
   defining a sequence of encryption keys by:
      designating one of the encryption keys as a current key, and
      designating the encryption key indicated by the key pointer of the current key as a successor key;
   responsive to a predetermined succession event, advancing the sequence of encryption keys by:
      designating the successor key as a new current key, and
      designating the encryption key indicated by the key pointer of the new current key as a new successor key;
      wherein the predetermined succession event is receipt by the data storage of an additional key which has been digitally signed using the private key corresponding to a next key;
   transmitting the current key to a remote computer system responsive to receipt of a key request indicating the remote computer system; and
   adding an additional key to the sequence of encryption keys by:
      receiving the additional key which has been digitally signed using the private key corresponding to an encryption key presently stored in the data storage, and setting the key pointer of the presently-stored key to indicate the additional key.

7. A computer system for storage and distribution of encryption keys in sequence, the computer system comprising a non-transitory computer readable memory and a processor, the computer system coupled to a data storage, software instructions being stored in the computer readable memory and executable to perform operations including:
   storing a plurality of encryption keys in a data storage, at least one of the encryption keys having key properties including a key pointer, the key pointer indicating another of the encryption keys, each of the plurality of encryption keys stored in the data storage is a public key having a corresponding private key;
   defining a sequence of encryption keys by:
      designating one of the encryption keys as a current key, and
      designating the encryption key indicated by the key pointer of the current key as a successor key;
   responsive to a predetermined succession event, advancing the sequence of encryption keys by:
      designating the successor key as a new current key, and
      designating the encryption key indicated by the key pointer of the new current key as a new successor key;
      wherein the predetermined succession event is receipt by the data storage of an additional key which has been digitally signed using the private key corresponding to a next key
   transmitting the current key to a remote computer system responsive to receipt of a key request indicating the remote computer system; and adding an additional key to the sequence of encryption keys by:
receiving the additional key which has been digitally signed using the private key corresponding to an encryption key presently stored in the data storage, and setting the key pointer of the presently-stored key to indicate the additional key.

8. The computer system of claim 7, wherein the key properties further include expiry data indicating an expiry date, and wherein the predetermined succession event is occurrence of the expiry date indicated by the expiry data of the current key.

9. The computer system of claim 7, wherein the predetermined succession event is receipt by the data storage of an expiry signal which has been digitally signed using the private key corresponding to the successor key.

10. The computer system of claim 7, wherein the data storage is a blockchain database.

11. The computer system of claim 7, wherein the key properties further include a key identifier, each key pointer being the key identifier of another encryption key to thereby indicate the another encryption key.

* * * * *